US009788554B2

(12) United States Patent
Van Zoelen et al.

(10) Patent No.: US 9,788,554 B2
(45) Date of Patent: Oct. 17, 2017

(54) METHOD AND SYSTEM FOR MOULDING FOOD PATTIES

(71) Applicant: MAREL TOWNSEND FURTHER PROCESSING B.V., Boxmeer (NL)

(72) Inventors: Martinus Johannes Willebrordus Van Zoelen, 's-Hertogenbosch (NL); Thomas Willem Dekker, Nijmegen (NL); Franciscus Quirinus Fredrik Verouden, Sint Anthonis (NL); Sigebertus Johannes Jacobus Jozef Meggelaars, Eindhoven (NL)

(73) Assignee: Marel Townsend Further Processing B.V., Boxmeer (NL)

( * ) Notice: Subject to any disclaimer, the term of this patent is extended or adjusted under 35 U.S.C. 154(b) by 0 days.

(21) Appl. No.: 14/417,778

(22) PCT Filed: Jul. 26, 2013

(86) PCT No.: PCT/NL2013/050563
§ 371 (c)(1),
(2) Date: Jan. 27, 2015

(87) PCT Pub. No.: WO2014/017916
PCT Pub. Date: Jan. 30, 2014

(65) Prior Publication Data
US 2015/0208674 A1    Jul. 30, 2015

Related U.S. Application Data

(60) Provisional application No. 61/676,627, filed on Jul. 27, 2012.

(51) Int. Cl.
*A22C 7/00*    (2006.01)

(52) U.S. Cl.
CPC .............. *A22C 7/00* (2013.01); *A22C 7/0023* (2013.01); *A22C 7/0069* (2013.01)

(58) Field of Classification Search
CPC ........ A22C 7/00; A22C 7/0023; A22C 7/0069
See application file for complete search history.

(56) References Cited

U.S. PATENT DOCUMENTS

| 3,887,964 A | * | 6/1975 | Richards | A22C 7/0076 |
| | | | | 425/556 |
| 4,182,003 A | * | 1/1980 | Lamartino | A22C 7/00 |
| | | | | 425/556 |

FOREIGN PATENT DOCUMENTS

| FR | 2435209 A1 | 4/1980 |
| GB | 1214114 A | 2/1970 |

OTHER PUBLICATIONS

International Patent Application No. PCT/NL2013/050563, International Search Report, dated Apr. 3, 2014, 6 pages.

* cited by examiner

*Primary Examiner* — Erik Kashnikow
*Assistant Examiner* — Preston Smith
(74) *Attorney, Agent, or Firm* — Kilpatrick Townsend & Stockton, LLP

(57) ABSTRACT

In a method for moulding food patties from a food product comprising a food mass (5) having a substantially coherent structure formed by particles of the food product that are loosely connected to each other, for example ground meat, the food product is first supplied to a supply hopper (3). Food product is moved in the supply hopper to at least one discharge opening (8) of the supply hopper, from which it is discharged. The food product that has been discharged from the discharge opening of the supply hopper is fed into at least one pump chamber (12) of a positive displacement pump system. Subsequently, the food product in the pump (Continued)

chamber is positively displaced to an outlet opening of the pump chamber by the positive displacement pump system (20). The food product is discharged from the outlet opening of the pump chamber, and then fed into a moulding device having a plurality of mould cavities for molding the food patties. The substantially coherent structure of at least a portion of the food mass is substantially maintained when said food mass is moved in the supply hopper to the discharge opening and also when said food mass or a portion thereof is discharged from the discharge opening of the supply hopper and fed into the pump chamber.

11 Claims, 5 Drawing Sheets

METHOD AND SYSTEM FOR MOULDING FOOD PATTIES

CROSS REFERENCE TO RELATED APPLICATIONS

This application is the U.S. national phase of International Application No. PCT/NL2013/050563 filed on Jul. 26, 2013, and published in English on Jan. 30, 2014 as International Publication No. WO 2014/017916 A2, which application claims the benefit of U.S. Provisional Application No. 61/676,627 filed on Jul. 27, 2012, the contents of all of which are incorporated herein by reference.

FIELD OF THE INVENTION

The invention relates to a method for moulding food patties from a food product, for example a mass of ground meat, the method comprising:
- supplying food product to a supply hopper, the food product comprising a food mass having a substantially coherent structure formed by particles of the food product that are loosely connected to each other,
- moving food product in the supply hopper to at least one discharge opening of the supply hopper,
- discharging food product from the discharge opening of the supply hopper,
- feeding food product that has been discharged from the discharge opening of the supply hopper into at least one pump chamber of a positive displacement pump system,
- positively displacing food product in the pump chamber to an outlet opening of the pump chamber by the positive displacement pump system,
- discharging food product from the outlet opening of the pump chamber,
- feeding food product that has been discharged from the outlet opening of the pump chamber into a moulding device having a plurality of mould cavities for moulding the food patties.

BACKGROUND

U.S. Pat. No. 4,054,967 assigned to Formax, Inc. discloses a method and apparatus for moulding food patties, in particular hamburger patties moulded from ground meat. In moulding the food patties, a supply of the food product from which the patties are to be formed is maintained in a supply hopper. From the hopper the food product is fed to a food pump of the reciprocating plunger type. It is mentioned that one of the problems with conventional food patty moulding techniques results from "churning" of the food product by a positive feed mechanism that supplies the food product to the pump. This results from the positive feeding action used to force the food product into the pump intake, and the attendant difficulty in avoiding circulatory flow. This churning may cause separation of the food product, e.g. separation of fat from other tissue in ground meat. In addition, the churning effect of the feeder mechanism may grind the food product into smaller particles than desired. In both instances, an undesired deterioration of the food product may result. Therefore, the food pump according to this document has a large access port for introducing food product into a narrow pump chamber. A supply of food product is continuously maintained in a position completely blocking the large access port that leads to the pump chamber so that the access port is prevented from being open to atmosphere. To introduce food product into the pump chamber, the pump plunger is rapidly withdrawn from the chamber, past the access port. The rapid withdrawal of the plunger from the chamber produces a partial vacuum and draws a quantity of food product from the supply hopper through the access port into the chamber. Thus, the food product is not forced into the food pump using a positive feeding action. Instead, the food product is drawn into the pump, primarily by the vacuum developed on rapid withdrawal of the plunger from the pump. Although this reduces churning of the food product, a positive feed mechanism (feed screws) in the supply hopper is still needed because the food product has to be continuously maintained in a position completely blocking the large access port that leads to the pump chamber. The operation of the feed screws still result in churning of the food product with resultant deterioration.

It has been acknowledged in U.S. Pat. No. 4,182,003 also assigned to Formax, Inc. that the vacuum intake pump of the kind described in U.S. Pat. No. 4,054,967 reduces the churning problem, but may not eliminate it entirely. Therefore, U.S. Pat. No. 4,182,003 proposes to align two counter-rotating feed screws along axes parallel to the direction of movement of the pump plunger. This enables the feed screws to function much in the manner of a gate valve with respect to the intake opening for pump chamber. The feed screws advance the food product into a feed screw end housing, which leads directly to the intake of the food pump. During the pumping stroke of the plunger, reverse movement of food product out of the pump chamber is blocked by the feed screws, that are now stationary, and by the food product contained in the feed screw end housing. The blocking effect of the feed screws and the food product in the feed screw end housing is such that there is little tendency for reverse pumping of food product from the pump chamber back through the pump intake opening. Instead, the food product is sheared along the level of the top of the plunger and is compressed in the forward end of the pump chamber. It is described that the gate valve action of the feed screws with respect to the food pump reduces churning of the food product at the pump intake. However, the operation of the feed screws, even if they are run only intermittently, causes agitation of the food product which induces deterioration of the food product. This affects the quality of the moulded food patties.

SUMMARY

An object of the invention is to provide an improved method for moulding food patties, in particular a method for moulding food patties that produces moulded food patties with excellent quality in terms of appearance, uniformity, taste, texture and bite.

This object is achieved according to the invention by a method for moulding food patties from a food product, for example ground meat, the method comprising:
- supplying food product to a supply hopper, the food product comprising a food mass having a substantially coherent structure formed by particles of the food product that are loosely connected to each other,
- moving food product in the supply hopper to at least one discharge opening of the supply hopper,
- discharging food product from the discharge opening of the supply hopper,
- feeding food product that has been discharged from the discharge opening of the supply hopper into at least one pump chamber of a positive displacement pump system, positively displacing food product in the pump chamber to an outlet opening of the pump chamber by the positive displacement pump system, discharging food product from the outlet opening of the pump chamber, feeding food product that has been discharged from the outlet opening of the pump chamber into a moulding device having a plurality of mould cavities for moulding the food patties, wherein the substantially coherent structure of at least a portion of the food mass is substantially maintained when said food mass is moved in the supply hopper to the discharge opening and also when said food mass or a portion thereof is discharged from the discharge opening of the supply hopper and fed into the pump chamber.

The method according to the invention is particularly useful for processing ground meat, preferably ground beef and/or ground porc. In this case, the substantially coherent structure of the food mass comprises string-like and/or serpentine and/or noodle-shaped particles that are adhered to each other. Thus, the food mass forms a dough. However, the food product that is supplied to the supply hopper may also comprises meat that is minced, chopped and/or shredded. In addition, the food product may also comprise chicken meat, fish meat, vegetables and/or other foodstuff.

With the method according to the invention, the food mass that has been fed into the pump chamber of the positive displacement pump system has maintained, at least partially, its substantially coherent structure before the food mass in the pump chamber is subjected to the positive displacement action of the pump system. In other words, the forces exerted onto the food mass, at least until the food mass has been fed to the pump chamber, are relatively weak so that the particles of the food product that are loosely connected to each other are hardly compressed, if at all, in a direction transverse to the movement direction of the food mass. The density of the food mass is hardly increased when the food mass is moved in the supply hopper and also when it is discharged from the supply hopper and fed to the pump chamber. In addition, the particles of the food product that are loosely connected to each other are not drawn apart while the food product is transferred in the supply hopper and to the pump chamber. If the substantially coherent structure of the food mass were broken up by pulling forces on the food particles, they would be subjected to shear loads deteriorating the characteristics of the food mass. Thus, the food mass is processed in such a delicate manner that the relatively light, substantially coherent structure of at least a portion of the food mass is maintained up to the pump chamber. As a result, churning of the food mass is substantially prevented until the food mass has been introduced in the pump chamber. This leads to food patties having excellent characteristics in terms of appearance, uniformity, taste, texture and bite.

It is noted that GB 1214114 discloses a device for feeding foodstuff, in particular chicken meat, by volumetrically sub-dividing into a number of portions of equal weight. For forming a number of portions of a product simultaneously by means of a plurality of measuring chambers of equal capacity, which are simultaneously filled with the product and subsequently emptied, the product to be filled should have a uniform density. To certain foodstuffs, such as for instance meat, a fairly uniform density can be imparted by mincing them very finely. According to this document, mincing of the starting product is in no way objectionable in the manufacture of certain articles, such as e.g. minced meat balls or meat or fish pastes. However, where the final product must contain whole pieces of chicken meat, it is desirable for the chicken meat to sustain the least possible damage, i.e. the pieces of meat retain as much as possible their original fibrous texture and are recognisable as such by the consumer of the final product, for example canned chicken soup or chicken pies.

It is preferred according to the invention that the food mass in the supply hopper is substantially not compressed in a direction transverse to the movement direction of the food mass in the supply hopper up to its discharge opening, and wherein the food mass is substantially not compressed either in a direction transverse to the movement direction of the food mass when said food mass is discharged from the discharge opening of the supply hopper and fed into the pump chamber. In this case, as the food product traverses the supply hopper, the supply hopper does not include a narrowing up to the discharge opening of the supply hopper. The transfer from the discharge opening of the supply hopper into the pump chamber does not include a narrowing either, i.e. the food mass does not pass a narrowing until it is received in the pump chamber. As a result, the light substantially coherent structure of the food mass is substantially preserved until the food mass is received in the pump chamber.

In an embodiment of the invention, the supply hopper has a cross-sectional flow area that does not decrease from a fill opening of the supply hopper up to the discharge opening of the supply hopper. The cross-sectional flow area of the supply hopper extends transverse to the movement direction of the food product. When the cross-sectional flow area of the supply hopper does not decrease, for example it remains substantially the same from the fill opening up to the discharge opening, the food mass is not subjected to lateral compression. This is advantageous for preserving desired characteristics of the food mass.

According to the invention, the pump chamber may be provided with an inlet opening that is formed by the discharge opening of the supply hopper. In this case, the discharge opening of the supply hopper constitutes the inlet opening of the pump chamber, i.e. the cross-sectional flow area delimited by the discharge opening defines the cross-sectional flow area of the inlet opening of the pump chamber. In other words, the food mass is directly transferred from the supply hopper into the pump chamber via the discharge opening/inlet opening. Consequently, the food mass is not compressed in a direction transverse to the movement direction of the food mass either when the food mass is transferred from the supply hopper into the pump chamber.

According to the invention, it is possible for the food product to be supplied to the supply hopper by means of a conveyor belt. Alternatively, with the method according to the invention, the food product can be supplied to the supply hopper from a container containing the food product, wherein the container containing the food product has been stored for at least 8 hours at a temperature below 6° C. before the food product is supplied from said container into the supply hopper. The container may comprise a base and a peripheral wall that extends from the base to an upper end. The upper end of the peripheral wall defines a container opening of the container. Usually, the base of the container is substantially rectangular or square, and the peripheral wall comprises four upstanding side walls. The container can have a capacity of 100-1000 liters, for example 200-500 liters. The container may have different dimensions, such as a length of 500-1500 mm, a width of 400-800 mm and a height of 400-800 mm. Preferably, the container has a length of 800 mm and a width of 800 mm.

After producing ground meat in a grinder, it is generally known to store the ground meat in such a container and keep the container with the ground meat under refrigeration for a period of time, such as overnight. As a result, the string-like and/or serpentine particles of the ground meat that are already loosely connected adjacent to each other upon production by the grinder, are adhered to each other more firmly so as to form a relatively light, substantially coherent structure of the food mass in the container. When the ground meat is subsequently processed further in the prior art, the relatively light, substantially coherent structure of the food mass is deteriorated by compressing the food mass and also by subjecting it to feed screws. In contrast thereto, according to the invention, the relatively light, substantially coherent structure of the food mass is preserved as much as possible. To this end, the ground meat in the supply hopper is driven in a movement direction toward the pump chamber with minimum external forces. This leads to food patties having excellent quality.

It is preferred according to the invention that the food mass is able to move in the supply hopper to its discharge opening by means of gravity only, and wherein the food mass is able to be discharged from the discharge opening of the supply hopper and fed into the pump chamber also by means of gravity only. In this case, the food mass is dumped into a fill opening of the supply hopper. The supply hopper forms a chute for guiding the food mass from the fill opening up to the discharge opening under the influence of gravity, i.e. the food mass descends to the discharge opening by its own weight. The food mass is discharged from the discharge opening of the supply hopper and driven into the pump chamber by its own weight as well. It depends on the amount of the food mass in the supply hopper if the food mass is able to descend to the discharge opening and therethrough into the pump chamber. The food mass is understood "to be able to move by means of gravity only" when the supply hopper is filled to at least 30% of its maximum capacity. Thus, according to the invention, the food mass is able to move in the supply hopper to its discharge opening and further into the pump chamber by its own weight when the supply hopper is filled to, for example, 30% or 50% or 80% of its maximum capacity. In any case, the food mass is able to move in the supply hopper to its discharge opening and subsequently into the pump chamber by its own weight when the supply hopper is filled to its maximum capacity. As a result, it is not needed to positively displace the food mass by, for example, feed screws that exert shear loads onto the food mass and cause undesired churning thereof.

According to the invention, the internal surfaces of the walls of the supply hopper may be designed to prevent the particles of the food mass from "sticking" to said surfaces. For example, the walls of the supply hopper can be made of a suitable material or coated with a suitable coating layer, the supply hopper may have porous walls with blow holes or the supply hopper may be provided with vibrating walls to remove any food product that has adhered to the walls.

It is preferred according to the invention that the food mass is not driven to the discharge opening of the supply hopper by a feed screw and is not driven from the discharge opening of the supply hopper into the pump chamber by a feed screw. As explained above, feed screws cause undesired churning of the food mass. This is prevented according to the invention by enabling the food mass in the supply hopper to be moved toward the discharge opening, and from the discharge opening into the pump chamber without the need for any feed screws, i.e. feed screws can be omitted according to the invention.

It is possible according to the invention that the pump chamber is fed with a portion of the food mass that is cut off from the food mass in the supply hopper, wherein the substantially coherent structure of at least a portion of the food mass is substantially maintained when said food mass is cut off from the food mass in the supply hopper. Thus, a portion of the food mass is cut off from the food mass in the supply hopper and said cut-off portion of the food mass is fed to the pump chamber while maintaining, at least partially, the substantially coherent structure in said cut-off portion of the food mass. This results in preservation of desired characteristics of the food mass.

In an advantageous embodiment of the invention, the discharge opening of the supply hopper opens into a side of the pump chamber, and wherein the positive displacement pump system comprises a plunger, and a drive system that is configured to move the plunger between a retracted position, in which the plunger is clear of the discharge opening of the supply hopper, and an extended position, in which the plunger extends past the discharge opening of the supply hopper and into the pump chamber, and wherein, with the plunger in the retracted position, a portion of food mass in the supply hopper is transferred through the discharge opening into the pump chamber in front of a plunger head of the plunger, and wherein, thereafter, said portion of the food mass is separated from the remainder of the food mass in the supply hopper and the separated portion of the food mass is closed off in the pump chamber, and wherein, when the separated portion of the food mass has been closed off in the pump chamber, the distance between the plunger head and an opposing end of the pump chamber is substantially equal to the width of the discharge opening, as seen in the direction of the longitudinal axis of the plunger, and wherein, thereafter, the plunger is driven to its extended position for impelling said portion of the food mass out of the outlet opening of the pump chamber. The drive system for moving the plunger may be pneumatically or hydraulically operated.

The width of the discharge opening determines the length of the portion of the food mass that is transferred from the supply hopper into the pump chamber and that is separated from the remainder of the food mass in the supply hopper, for example by cutting through the substantially coherent structure of the food mass along the discharge opening. The separated portion of the food mass is closed off in the pump chamber between the plunger head and the opposing end of the pump chamber. When the separated portion of the food mass has just been closed off in the pump chamber, the plunger is still in a position in which the plunger head has not yet pressurised the separated portion of the food mass. After all, the width of the discharge opening, and thus also the length of the separated portion of the food mass, is substantially equal to the distance between the plunger head and the opposing end of the pump chamber. It is only after closing off the separated portion of the food mass that the plunger with the plunger head starts to pressurise the separated portion of the food mass. As a result, the food mass cannot flow from the pump chamber back into the supply hopper upon pressurization by the plunger head. Thus, the substantially coherent structure of said portion of the food mass remains substantially intact until it is separated and closed off and the substantially coherent structure is not affected by churning effects that may be caused by any backflow of the food mass.

In one embodiment according to the invention, the pump chamber has a length, as seen in the direction of the longitudinal axis of the plunger, that is greater than the width of the discharge opening, and wherein the portion of the food mass that has been transferred through the discharge opening into the pump chamber in front of the plunger head of the plunger, is separated from the remainder of the food mass in the supply hopper by advancing the plunger past the discharge opening to an intermediate position so that said portion of the food mass is pushed forward by the plunger head until said portion of the food mass is moved past the discharge opening and closed off therefrom in the pump chamber, and wherein, thereafter, the plunger is advanced further to its extended position for impelling said portion of the food mass out of the outlet opening of the pump chamber.

In this case, the pump chamber comprises an intake zone and a pressure zone. For example, the length of the pump chamber may be about twice as great as the width of the discharge opening, wherein the intake zone and the pressure zone each have the same length that is substantially equal to the width of the discharge opening. Incidentally, the height of the intake zone and the height of the pressure zone are preferably also about the same. With the plunger in its retracted position, the portion of the food mass that is transferred from the supply hopper into the pump chamber is received in the intake zone of the pump chamber. The plunger is then driven to its intermediate position so that the portion of the food mass that has been received in the intake zone, is advanced by the plunger head to the pressure zone of the pump chamber. At the same time, said portion of the food mass is separated from the remainder of the food mass in the supply hopper as the plunger head moves past the discharge opening and cuts through the food mass. In the intermediate position of the plunger, the plunger head defines the transition between the intake zone and the pressure zone of the pump chamber. In the intermediate position, the portion of the food mass is entirely separated and closed off in the pressure zone of the pump chamber. Subsequently, the plunger head is driven forward to its extended position to force said portion of the food mass out of the outlet opening of the pump chamber.

Alternatively, the positive displacement pump comprises a valve plate that can be driven between an open position, in which the valve plate is clear of the discharge opening of the supply hopper, and a closed position, in which the valve plate closes the discharge opening of the supply hopper, and wherein, with the valve plate in the open position, a portion of the food mass in the supply hopper is transferred through the discharge opening into the pump chamber in front of the plunger head of the plunger, and wherein, thereafter, the portion of the food mass that has been transferred through the discharge opening into the pump chamber in front of the plunger head of the plunger, is separated from the remainder of the food mass in the supply hopper by moving the valve plate along the discharge opening to its closed position so that said portion of the food mass is cut off by the valve plate, and wherein, with the valve plate in its closed position, the cut-off portion of the food mass is closed off in the pump chamber, and wherein, thereafter, the plunger is advanced further to its extended position for impelling said portion of the food mass out of the outlet opening of the pump chamber.

In this case, the pump chamber may have a length, as seen in the direction of the longitudinal axis of the plunger, that is substantially equal to the width of the discharge opening. The valve plate can be driven along a longitudinal axis that is substantially parallel to the longitudinal axis of the plunger. With the plunger in its retracted position and the valve plate in its open position, the portion of the food mass that is transferred from the supply hopper into the pump chamber is received in the pump chamber. The valve plate is then advanced to its closed position while the plunger is held in its retracted position. As the valve plate moves to its closed position, the leading edge of the valve plate cuts through the food mass. Thereby, the portion of the of the food mass in the pump chamber is separated from the remainder of the food mass in the supply hopper. After reaching the closed position, the discharge opening is closed and the separated portion of the food mass is closed off in the pump chamber. Subsequently, while the valve plate is held in its closed position, the plunger head is driven from its retracted position to its extended position so as to force said portion of the food mass out of the outlet opening of the pump chamber.

With the method according to the invention, it is possible for the positive displacement pump system to positively displaced the food mass in the pump chamber to its outlet opening while substantially maintaining the substantially coherent structure of at least a portion of the food mass in said pump chamber. In particular, the food mass in the pump chamber is subjected to a driving force in the longitudinal direction of the pump chamber only and the food mass in the pump chamber is substantially not compressed in a direction transverse to the movement direction of the food mass in the pump chamber up to its outlet opening. Preferably, the food mass is substantially not compressed in a direction transverse to the movement direction of the food mass either when said food mass is discharged from the outlet opening of the pump chamber. Again, the desired properties of the food mass are maintained to a large extent.

In a preferred embodiment according to the invention, the supply hopper comprises:
  a main hopper zone that receives the food mass that is supplied to the supply hopper,
  a dividing member, preferably a knife edge, that is arranged inside the supply hopper at a downstream end of the main hopper zone, wherein the dividing member divides the food mass into two streams of food mass while substantially maintaining the substantially coherent structure of at least a portion of the food mass in each stream,
  two feed channels, each feed channel extending from the dividing member, wherein each feed channel transports one of said streams of food mass while substantially maintaining the substantially coherent structure of at least a portion of the food mass in each stream, and also
  two discharge openings, each discharge opening extending at a downstream end of one of the feed channels, wherein each discharge opening discharges one of said streams of food mass or a portion thereof while substantially maintaining the substantially coherent structure of at least a portion of the food mass, and
wherein the positive displacement pump system comprises:
  two pump chambers, each pump chamber being in communication with one of the discharge openings, and each pump chamber having an outlet opening,
  a valve manifold that is connected to the outlet openings of the pump chambers, and wherein the valve manifold comprises an outlet passageway that is connected to the moulding device, and
  wherein the food mass or a portion thereof of said streams are fed into the pump chambers in alternation so that at least one pump chamber always contains food mass under pressure so as to supply a substantially continuous flow of food mass from the pump chambers via the valve manifold to the moulding device.

In this case, the fill opening of the supply hopper opens into the main hopper zone. At the downstream end of the main hopper zone, the dividing member divides the food mass into two streams of food mass. For example, the dividing member comprises a cutting blade. Each stream of food mass flows separately along a flow path formed by a feed channel, a discharge opening and a pump chamber. The flow paths are joined again by connecting the outlet openings of the pump chambers to the common valve manifold. From there, the food mass is impelled to the moulding device. The food mass in the main hopper zone and in the feed channels of the supply hopper is substantially not compressed in a direction transverse to the movement direction of the food mass up to the discharge openings. The food mass is substantially not compressed either in a direction transverse to the movement direction of the food mass when the food mass of each stream is discharged from one of the discharge openings of the supply hopper and fed into one of the pump chambers. As explained above, this prevents undesired deterioration of the substantially coherent structure of the food mass so that the moulded food patties obtain excellent characteristics.

It is possible according to the invention that the total cross-section flow area of the feed channels together is substantially equal to the cross-sectional flow area of the main hopper zone, and wherein the cross-sectional flow area of each discharge opening is substantially equal to the cross-sectional flow area of the associated feed channel. In this case, it is preferred that the cross-sectional flow area of the main hopper zone is substantially constant, as seen in the movement direction of the food mass in the main hopper zone. When the sum of the cross-sectional flow areas of the feed channels is substantially equal to the cross-sectional flow area of the main hopper zone, the food mass is not subjected to lateral compression as it is split into two streams of food mass upon traversing the dividing member. As a result, shear loads on the food mass are limited to a minimum and the desired relatively light structure of the food mass is substantially maintained in both streams of food mass. In addition, the cross-sectional area of each feed channel is substantially constant and equal to the flow area of its discharge opening. Thus, each stream of food mass is not subjected to lateral compression either when it flows through the feed channel, out of the discharge channel and into one of the pump chambers.

In a further embodiment according to the invention, the pump chambers are situated on either side of the valve manifold. In contrast to the prior art, in which the pump chambers are situated side-by-side, the pump chambers according to this embodiment of the invention are facing toward each other. It has surprisingly been found that this configuration results in even better food patties quality.

It is possible according to the invention that the positive displacement pump system comprises one plunger for each pump chamber, wherein each plunger can be moved by the drive system between a retracted position, in which said plunger is clear of the discharge opening of one of the feed channels, and an extended position, in which said plunger extends past the discharge opening of said one of the feed channels and into the associated pump chamber, and wherein the longitudinal axes of the plungers of the pump chambers are situated substantially in the same plane. For example, the longitudinal axes of the plungers are aligned with each other in substantially the same vertical plane. The longitudinal axes of the plungers may be inclined with respect to each other according to a V-shape or they may also run in substantially the same horizontal plane. As the pump chamber are situated on either side of the valve manifold, the plungers of the pump chambers are facing toward each other. Thus, when one of the plungers is moved from its retracted position to its extended position, said plunger is advanced in the direction toward the other plunger. It has surprisingly been found that this configuration is advantageous for food patties quality.

In an embodiment according to the invention, the valve manifold comprises a valve member that can be operated alternately between a first position, in which the valve member closes the outlet opening of a first pump chamber and allows food mass to be transferred from the outlet opening of the other second pump chamber to the outlet passageway that is connected to the moulding device, and a second position, in which the valve member closes the outlet opening of said other second pump chamber and allows food mass to be transferred from the outlet opening of said first pump chamber to the outlet passageway that is connected to the moulding device. Thus, the valve manifold is configured to pass food mass alternately from the pump chambers under pressure to the moulding device so that a substantially continuous flow of food mass is fed to the moulding device. At the same time, the valve member of the valve manifold prevents any backflow as the pump chamber that may not be under pressure is closed off. It is possible according to the invention that the valve member is operated to be moved between the first and second positions before the respective plungers of the pump chamber reach their outermost extended positions. Thus, the outlet opening of the first pump chamber is not yet entirely closed by the valve member when the valve member already opens the outlet opening of the other second pump chamber. This results in high production speeds.

In a preferred embodiment of the invention, the valve member is configured to cut through the food mass in the valve manifold when the valve member is operated from the first position to the second position and vice versa, and wherein the substantially coherent structure of at least a portion of the food mass is substantially maintained when said food mass is cut by the valve member in the valve manifold. In this case, the valve member is configured to cut off the food mass received in the valve manifold. For example, the valve member may be formed with cutting edges.

The moulding device according to the invention can be constructed in various ways. In a specific embodiment according to the invention, the moulding device comprises a moulding drum which is rotatable about a rotation axis, wherein the moulding drum has a substantially cylindrical moulding surface in which the plurality of mould cavities for moulding the food patties are arranged. In this case, it may be possible for the food product that has been discharged from the outlet opening of the pump chamber to be fed to a dispensing mouth that adjoins the moulding surface of the moulding drum, and wherein the dispensing mouth is surrounded by an abutment plate that sealingly abuts the moulding surface of the moulding drum during rotation of the moulding drum about the rotation axis.

The abutment plate is preferably flexible. The abutment plate abuts the moulding surface of the moulding drum while allowing rotation of the moulding drum about the rotation axis. As the moulding drum rotates, the dispensing mouth is either closed off by the moulding surface of the moulding drum or in communication with one or more mould cavities, while leakage between the moulding drum and the abutment plate is prevented by exerting sufficient pressure to the flexible abutment plate.

In an alternative embodiment of the moulding device according to the invention, the moulding device comprises a mould plate having the plurality of mould cavities, and wherein the mould plate is cyclically moved by a mould plate drive between a fill position, in which mould cavities are in communication with the outlet opening of the pump chamber so as to mould food patties in said mould cavities, and a discharge position, in which the food patties moulded in said mould cavities can be knocked-out of said mould cavities.

It is possible according to the invention that the supply hopper and the positive displacement pump system are situated above the moulding device so that the food product that has been discharged from the outlet opening of the pump chamber is fed downward into the moulding device. Then, it is preferred according to the invention that the supply hopper and the positive displacement pump system are fixed in a frame, and wherein the moulding device can be displaced with respect to the frame between an upper position, in which the moulding device is connected to the positive displacement pump system, and a lower position, in which the moulding device is at a distance below the positive displacement pump system. As a result, the moulding device is easily accessible for maintenance, for example to replace a moulding drum of the moulding device.

The invention also relates to a system for moulding food patties from a food product, for example ground meat, the system comprising:
- a supply hopper for receiving a food product comprising a food mass having a substantially coherent structure formed by particles of the food product that are loosely connected to each other, the supply hopper comprising at least one discharge opening and being configured to allow food product in the supply hopper to move to the discharge opening,
- a positive displacement pump system comprising at least one pump chamber, the pump chamber being connected to the discharge opening of the supply hopper for feeding food product that is discharged from the discharge opening of the supply hopper into the pump chamber of a positive displacement pump system, the positive displacement pump system being configured to positively displace food product in the pump chamber to an outlet opening of the pump chamber and to discharge food product from said outlet opening,
- a moulding device having a plurality of mould cavities for moulding the food patties, the moulding device being connected to the outlet opening of the pump chamber for feeding food product that has been discharged from the outlet opening of the pump chamber into said moulding device, wherein the system is configured in such a manner that the substantially coherent structure of at least a portion of the food mass is substantially maintained when said food mass is moved in the supply hopper to the discharge opening and also when said food mass or a portion thereof is discharged from the discharge opening of the supply hopper and fed into the pump chamber.

The features described above in respect of the method according to the invention can also be applied, in isolation or in any combination of features, to the system according to the invention. Furthermore, the technical effects explained above also apply to the system according to the invention.

According to a second aspect, the invention relates to a system for moulding food patties from a food product, for example ground meat, the system comprising:
- a supply hopper for receiving a food product, the supply hopper comprising two discharge openings, the supply hopper being configured to allow food product in the supply hopper to move to the discharge openings, and each discharge opening being configured to discharge food product or a portion thereof, and
- a positive displacement pump system comprising:
  - two pump chambers, each pump chamber being connected to one of the discharge openings for feeding food product that is discharged from the discharge opening of the supply hopper into said pump chamber, and each pump chamber having an outlet opening for discharging food product therefrom,
  - a valve manifold that is connected to the outlet openings of the pump chambers for feeding food product that is discharged from the outlet openings of the pump chambers into the valve manifold, the valve manifold having an outlet passageway,
  - two positive displacement members, each positive displacement member being configured to positively displace food product in one of the pump chambers to the outlet opening of said pump chamber, the positive displacement members being configured to be operated in alternation so that at least one pump chamber always contains food product under pressure so as to discharge a substantially continuous flow of food product from the pump chambers out of the outlet passageway of the valve manifold, and
- a moulding device having a plurality of mould cavities for moulding the food patties, the moulding device being connected to the outlet passageway of the valve manifold for feeding food product that is discharged from the outlet passageway of the valve manifold into the moulding device, and wherein the pump chambers are situated on either side of the valve manifold.

According to the second aspect of the invention, it is preferred that each positive displacement member comprises a plunger, wherein each plunger can be moved by a drive system between a retracted position, in which said plunger is clear of one of the discharge openings of the supply hopper, and an extended position, in which said plunger extends past said discharge opening and into the associated pump chamber, and wherein the longitudinal axes of the plungers of the pump chambers are situated substantially in the same plane.

It is possible according to the second aspect of the invention that the supply hopper comprises:
- a main hopper zone that receives the food mass that is supplied to the supply hopper,
- a dividing member that is arranged inside the supply hopper at a downstream end of the main hopper zone, the dividing member being configured to divide the food product into two streams of food product,
- two feed channels, each feed channel extending from the dividing member and transporting one of said streams of food product, and also
- two discharge openings, each discharge opening extending at a downstream end of one of the feed channels, wherein each discharge opening discharges one of said streams of food product or a portion thereof.

BRIEF DESCRIPTION OF THE FIGURES

The invention will now be explained in more detail, by way of example only, with reference to the accompanying drawing.

DETAILED DESCRIPTION

Figure 1:
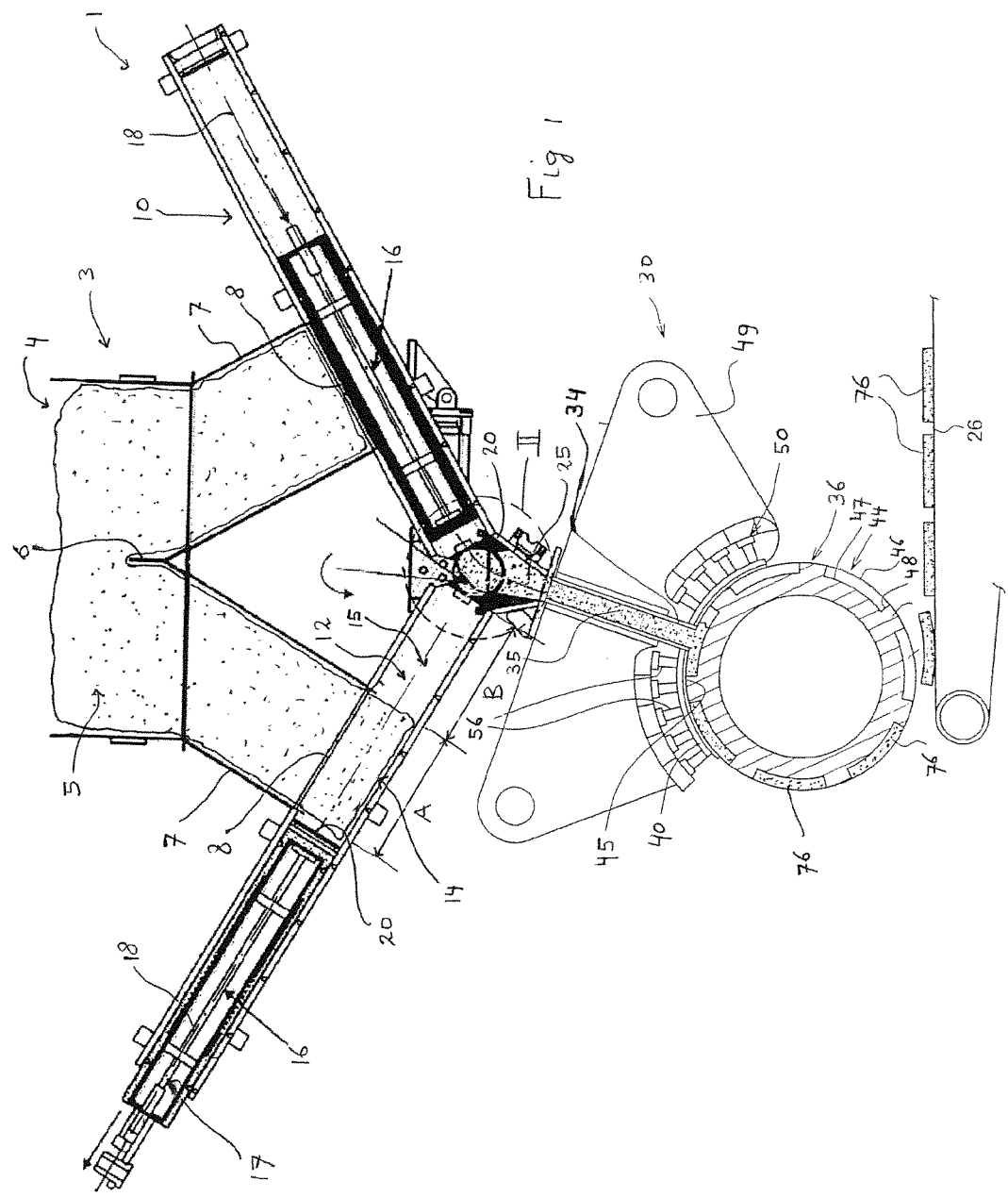
FIG. 1 diagrammatically shows a side view of a first embodiment of a system for moulding food patties according to the invention.

FIG. 1 shows a first embodiment of a system 1 for moulding for moulding food patties from a food mass having a substantially coherent structure which can be pumped and is suitable for consumption, in particular a food mass of ground meat having a substantially coherent structure comprising string-like and/or serpentine particles that are adhered to each other. Thus, the food mass forms a meat dough. The method according to the invention is particularly advantageous when the ground meat is ground beef and/or ground porc. However, the food mass may also comprises other types of meat, such as chicken meat, fish meat, vegetables and/or other foodstuff.

The substantially coherent structure of a food mass of ground meat is formed by grinding meat in a grinder and subsequently receiving the ground meat in a container that is stored in a cold-storage chamber, for example during at least 8 hours at a temperature below 6° C. The string-like and/or serpentine particles of the ground meat that are already loosely connected adjacent to each other upon production by the grinder, are adhered to each other more firmly by keeping it under refrigeration for a period of time so as to form a relatively light, substantially coherent structure of the food mass in the container. When the ground meat is subsequently processed further in the prior art, the relatively light, substantially coherent structure of the food mass is deteriorated by compressing the food mass and also by subjecting it to feed screws which causes churning of the food mass. In contrast thereto, according to the invention, the relatively light, substantially coherent structure of the food mass is preserved as much as possible as will be explained below.

The food mass is supplied from the container to a fill opening 4 of a supply hopper 3. In this exemplary embodiment, the supply hopper 3 comprises a main hopper zone 5 for receiving the food mass that is supplied to the fill opening 4. The food mass descends to the level of a dividing member 6 that is arranged in the interior of the supply hopper 3. The dividing member 6 is configured to cut the food mass from the main hopper zone 5 into two streams of food mass. The level of the dividing member 6 defines the downstream end of the main hopper zone 5. The supply hopper 3 comprises two feed channels 7 and two discharge openings 8. Each stream of food mass that passes the dividing member 6 is received in one of the feed channels 7. Each feed channel 7 guides one of said streams of food mass to the discharge opening 8 at a downstream end of said feed channel 7.

As shown in FIG. 1, the supply hopper 3 is not provided with any feed screws which may cause churning of the food mass. The food mass is able to move in the supply hopper 3 from its fill opening 4 to its discharge openings 8 by means of gravity only. The main hopper zone 5 and the feed channels 7 constitute chutes for guiding the food mass or a stream thereof. In addition, the main hopper zone 5 has a cross-sectional flow area that does not decrease from the fill opening 4 of the supply hopper 3 to the level of the dividing member 6. Furthermore, the total cross-section flow area of the feed channels 7 together is substantially equal to the cross-sectional flow area of the main hopper zone 5, and the cross-sectional flow area of each discharge opening 8 is also substantially equal to the cross-sectional flow area of the associated feed channel 7. Thus, the supply hopper 3 has a cross-sectional flow area for the food mass that does not decrease from the fill opening 4 up to the discharge openings 8 of the supply hopper 3.

As a result, the food mass in the supply hopper 3 is substantially not compressed in a direction transverse to the movement direction of the food mass in the supply hopper 3 up to the discharge openings 8. As the food mass traverses the supply hopper 3, it does not encounter any narrowing up to the discharge openings 8. Thus, the substantially coherent structure of the food mass is not affected. In addition, the dividing member 6 is configured to cut the food mass into two streams while substantially maintaining the substantially coherent structure of at least a portion of the food mass in each stream.

The food mass of each stream is fed to a positive displacement pump system 10. In this exemplary embodiment, the positive displacement pump system 10 comprises two pump chambers 12 that are each flow-connected to one of the discharge openings 8. Each discharge opening 8 of the supply hopper 3 debouches into a side of one of the pump chambers 12 and thus forms an inlet opening of said pump chamber 12. The food mass is substantially not compressed in a direction transverse to the movement direction of the food mass when said food mass is discharged from the discharge opening 8 of the supply hopper 3 and fed into the pump chamber 12. In other words, the discharge opening 8 of the supply hopper 3 does not form a narrowing either, i.e. the food mass does not encounter any narrowing until it is received in the pump chamber 12. As a result, the light substantially coherent structure of the food mass remains substantially intact.

The pump system 10 comprises one plunger 16 for each pump chamber, and a drive system for moving each plunger 16 between a retracted position (shown on the left in FIG. 1) and an extended position (shown on the right in FIG. 1). The drive system for the plungers 16 may be operated pneumatically or hydraulically, for example using water as hydraulic fluid. In this exemplary embodiment, the pump system 10 is symmetrical with respect to a central vertical plane. Therefore, only the side of the pump system 10 shown on the left in FIG. 1 will now be described as the other side of the pump system 10 shown on the right in FIG. 1 is essentially the same.

The pump chamber 12 has a length, as seen in the direction of the longitudinal axis 18 of the plunger 16, that is greater than the width A of the discharge opening 8. In this exemplary embodiment, the length of the pump chamber 12 is about twice as great as the width A of the discharge opening 8. The pump chamber 12 comprises an intake zone 14 and a pressure zone 15 that have the same length A, B that is substantially equal to the width of the discharge opening 8. In the retracted position, the plunger 16 is clear of the discharge opening 8 of the supply hopper 3. With the plunger 16 in the retracted position, a portion of the food mass is transferred from the feed channel 7 of the supply hopper 3 through the discharge opening 8 into the intake zone 14 of the pump chamber 12 in front of a plunger head 20 of the plunger 16. The width of the discharge opening 8 determines the length of the portion of the food mass that is transferred from the feed channel 7 of the supply hopper 3 into the pump chamber 12.

The plunger 16 is then driven so that the portion of the food mass that has been received in the intake zone 14, is advanced by the plunger head 20 to the pressure zone 15 of the pump chamber 12. At the same time, said portion of the food mass is separated from the remainder of the food mass in the supply hopper 3 as the plunger head 20 moves past the discharge opening 8 and cuts through the food mass while maintaining the substantially coherent structure of the food mass. When the plunger head 20 closes the discharge opening 8, the plunger head 20 defines the pressure zone 15 of the pump chamber 12. Then, the portion of the food mass has been entirely separated and the separated portion of the food mass has been closed off in the pressure zone 15 of the pump chamber 12. At this stage, the distance B between the plunger head 20 and an opposing end of the pump chamber 12 is substantially equal to the width A of the discharge opening 8, as seen in the direction of the longitudinal axis 18 of the plunger 16 (see FIG. 1).

When the separated portion of the food mass has just been closed off in the pump chamber 12, the plunger 12 is still in a position in which the plunger head 20 has not yet pressurised the separated portion of the food mass. After all, the width of the discharge opening A, and thus also the length of the separated portion of the food mass, is substantially equal to the distance B between the plunger head and the opposing end of the pump chamber 12. It is only after closing off the separated portion of the food mass that the plunger 16 with the plunger head 20 starts to pressurise the separated portion of the food mass. As a result, the food mass cannot flow from the pump chamber 12 back into the supply hopper 3 upon pressurization by the plunger head 20. Thus, the substantially coherent structure of the portion of the food mass is not affected by churning effects that may be caused by any backflow of the food mass.

Subsequently, the plunger head is driven forward to its extended position, in which the plunger 16 extends past the discharge opening 8 of the supply hopper 3 and substantially completely into the pump chamber 12. As a result, said portion of the food mass is displaced out of the outlet opening 19 of the pump chamber 12 into a valve manifold 21.

Figure 2:
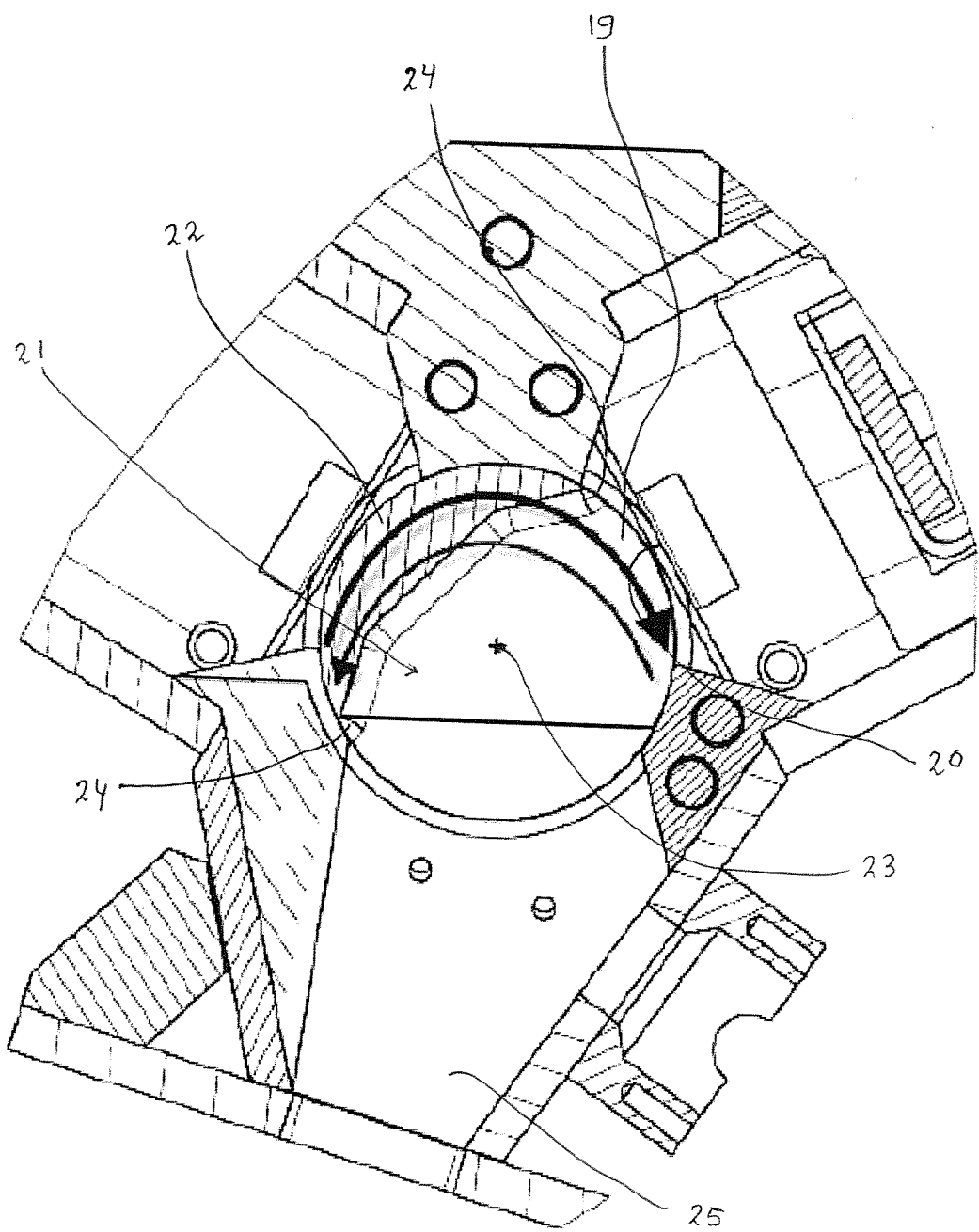
FIG. 2 diagrammatically shows an enlarged detail II from FIG. 1.

The valve manifold is shown in more detail in FIG. 2. The valve manifold 21 is connected to the outlet openings 19 of the pump chambers 12. The valve manifold 21 comprises an outlet passageway 25 that is connected to a moulding device 30. By driving the plungers 16, portions of the food mass of the streams in the feed channels 7 are fed into the pump chambers 12 in alternation so that at least one pump chamber 12 always contains food mass under pressure so as to supply a substantially continuous flow of food mass from the outlet openings of the pump chambers 12 into the valve manifold 21.

The valve manifold 21 comprises a valve member 22 that can be driven alternately between two positions. In the first position shown in FIG. 2, the valve member 22 closes the outlet opening 19 of the pump chamber 12 on the left and allows food mass to be transferred from the outlet opening of the other pump chamber 12 on the right to the outlet passageway 25 that is connected to the moulding device 30. In the second position, the valve member has been rotated about the rotation axis 23 so as to close the outlet opening 19 of the pump chamber on the right and to allow food mass to be transferred from the outlet opening 19 of the pump chamber 12 on the left to the outlet passageway 25. Thus, the valve manifold 21 is configured to pass food mass alternately from the pump chambers 12 under pressure to the moulding device 30 so that a substantially continuous flow of food mass is fed to the moulding device 30. At the same time, the valve member 22 of the valve manifold 21 prevents any backflow to the pump chamber that is not under pressure.

Figure 3:
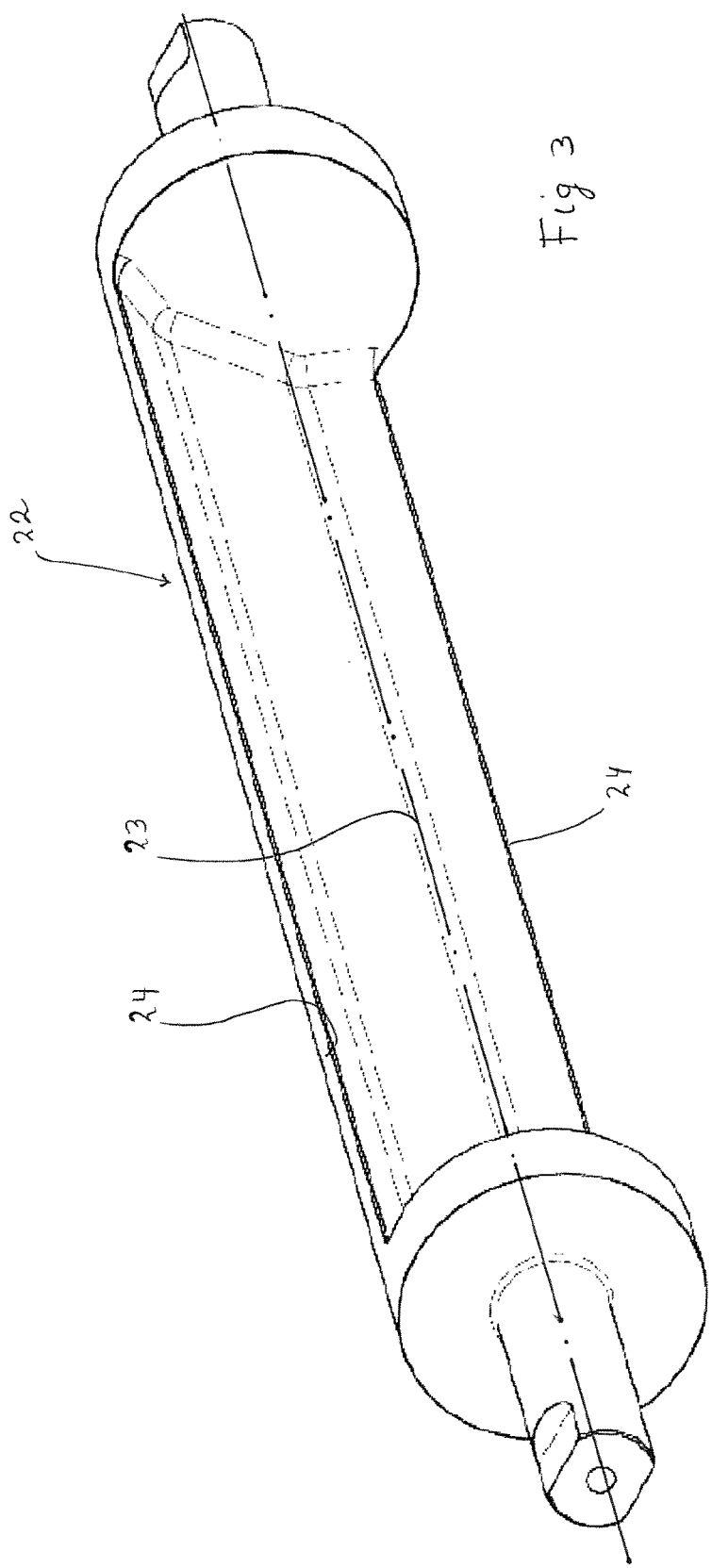
FIG. 3 shows a perspective view of a valve member of a valve manifold illustrated in FIG. 2.

As illustrated in FIG. 3, the valve member 22 is configured to cut through the food mass in the valve manifold 21 when the valve member 22 is rotated from the first position to the second position and vice versa. In this exemplary embodiment, the valve member 22 comprises cutting edges 24 so that the substantially coherent structure of at least a portion of the food mass is also substantially maintained when said food mass is cut by said cutting edges 24 in the valve manifold 21.

As shown in FIG. 1, the supply hopper 3 and the pump system 10 are situated above the moulding device 30 so that the food product that has been discharged from the valve manifold 21 is fed downward into the moulding device 30. The supply hopper 3 and the pump system 10 can be fixed in a support frame (not shown) that may be provided with wheels. The moulding device 30 can be displaced with respect to the support frame between an upper position, in which the moulding device 30 is connected to the valve manifold 21 of the pump system 10, and a lower position, in which the moulding device 30 is disconnected from the valve manifold 21 and at a distance below the valve manifold 21. Thus, the moulding device 30 is easily accessible for maintenance.

In this exemplary embodiment, the moulding device 30 comprises a fill passage device 35 and a moulding drum 36. The moulding drum 36 is rotatable about a substantially horizontal rotation axis. The moulding drum 36 is rotatably mounted to the support frame that supports the supply hopper 3 and the pump system 10 (not shown). The moulding drum 36 can be rotatably driven, such as by an electric motor (not shown). The outer peripheral surface of the moulding drum 36 forms a moulding surface 45 which contains a plurality of mould cavities 44.

The mould cavities 44 are configured to mould food patties from the food mass. The shape of the mould cavities 44 corresponds to the shape of the food patties to be moulded. Each mould cavity 44 comprises a bottom 47 and a peripheral wall 48 which extends from the bottom 47 to the moulding surface 45. The peripheral edge of the peripheral wall 48 on the moulding surface 45 defines a mould cavity opening 46 of the mould cavity 44. The dimensions of the bottom 47 and the peripheral wall 48 of each mould cavity 44 determine the volume of said mould cavity 44. The volume of each mould cavity 44 is fixed. For example, the dimensions of the mould cavities 44 are equal to each other so as to mould the same food patties.

The mould cavities 44 may be distributed across the moulding drum in different ways. As illustrated in FIG. 1, the mould cavities 44 are spaced apart in the peripheral direction of the moulding drum 36. In addition, the mould cavities 44 are arranged in rows next to one another, for example in the axial direction of the moulding drum 36, in the moulding surface 45. However, the mould cavities 44 can also be distributed across the moulding surface 45 according to a helix or in a different manner.

The fill passage device 35 is configured to fill the mould cavities 44 of the moulding drum 36. The fill passage device 35 distributes the food mass over the mould cavities 44 of the moulding drum 36. The fill passage device 35 comprises a filling shoe 49 having a passage 32 for the food mass. The passage 32 is connected to the outlet passageway 25 of the valve manifold 21, for example by means of a detachable coupling. The passage 32 extends to a dispensing mouth 34.

The dispensing mouth 34 faces the moulding drum 36, that is to say the dispensing mouth 34 faces the mould cavities 44 of the moulding drum 36. The dispensing mouth 34 is arranged in a flexible abutment plate 40 of the filling shoe 49. In cross section, the abutment plate 40 substantially has the shape of a segment of a circle, the diameter of which corresponds to the diameter of the moulding surface 45 of the moulding drum 36. The flexible abutment plate 40 abuts the moulding surface 45 of the moulding drum 36 while allowing rotation of the moulding drum 36 about the rotation axis. As the moulding drum 36 rotates, the dispensing mouth 34 is either sealed off by the moulding surface 45 of the moulding drum 36 or flow-connected to a row of mould cavities 44, while leakage between the moulding drum 36 and the flexible abutment plate 40 is prevented by pressing the flexible abutment plate 40 against the moulding surface 45 of the moulding drum 36 by means of actuating means 50, 56 at an adjustable pressure. However, the sealing between the abutment surface 40 of the filling shoe 49 and the moulding surface 45 of the moulding 36 may also be designed differently.

In this exemplary embodiment, the dispensing mouth 36 is slot-shaped. The passage 32 has a substantially constant cross-section from the outlet passageway 25 of the valve manifold 21 to the slot-shaped dispensing mouth 34. The slot-shaped dispensing mouth 34 extends across virtually the entire width (in the axial direction) of the moulding drum 36. With the mould cavities 44 being arranged next to one another in rows in the width direction in the moulding surface 45 of the moulding roller 16, the slot-shaped dispensing mouth 36 can fill the mould cavities 44 of one row simultaneously.

The food mass is transferred to the dispensing mouth 34 via the passage 32 due to the action of the positive displacement pump system 10. A controlled volume of the food mass flows from the dispensing mouth 34 into a row of mould cavities 44 if said row of mould cavities 44 is in communication with the dispensing mouth 34, that is to say when said row of mould cavities 44 passes the dispensing mouth 34 during rotation of the moulding drum 36. As a result thereof, the mould cavities 44 of said row are filled and a moulded product 76 is moulded in each mould cavity 44 of said row.

The products 76 moulded in the mould cavities 44 are then released from the mould cavities 44 and placed on the discharge device 26 and discharged. The discharge device 26 comprises a conveying device which is fitted under the moulding drum 36, for example an endless conveyor belt. By means of the conveying device, the products can then be moved to, for example, one or more processing stations, such as a protein-coating device, a breadcrumb-coating device, a freezing device and/or a packaging device.

Figure 4:
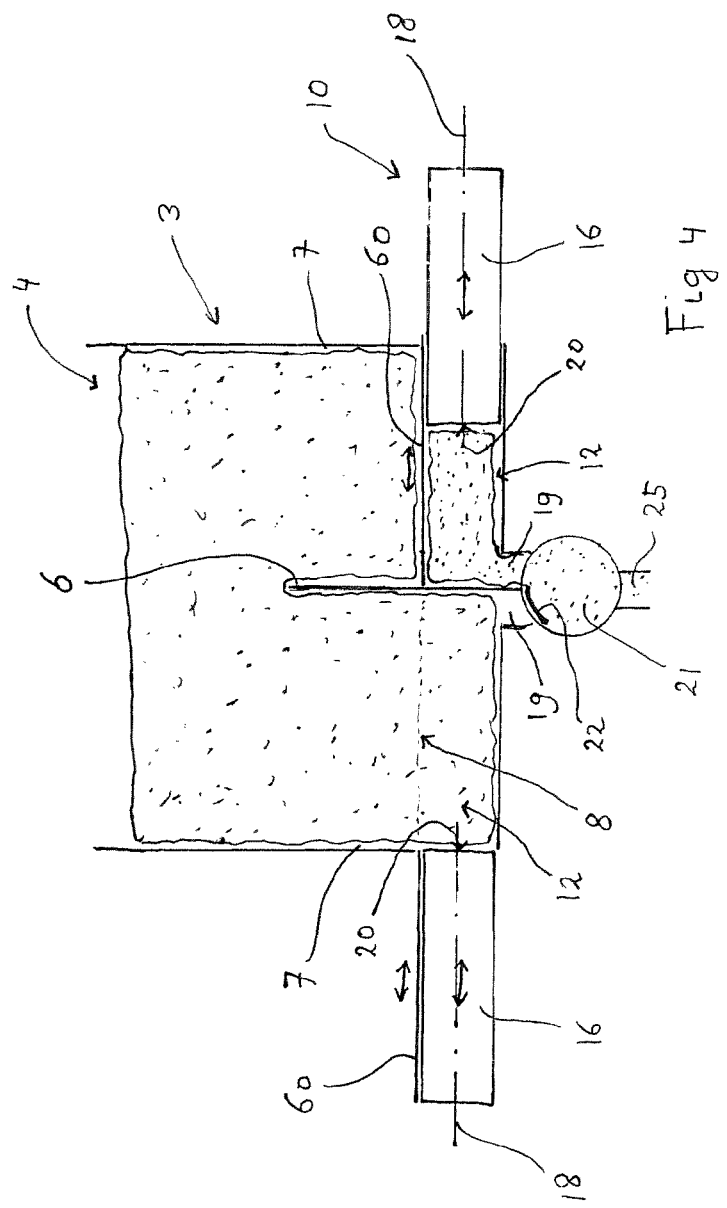
FIG. 4 diagrammatically shows a second embodiment of a system for moulding food patties according to the invention.

FIG. 4 shows a second embodiment of a system according to the invention. The same and similar components are designated with the same reference numerals. In this embodiment, the positive displacement pump system 10 comprises a valve plate 60 that can be driven between an open position, in which the valve plate 60 is clear of the discharge opening 8 of the supply hopper 3 (see on the left in FIG. 4), and a closed position, in which the valve plate 60 closes the discharge opening 8 of the supply hopper 3 as illustrated on the right in FIG. 4. As shown in FIG. 4, the pump chamber 12 has a length, as seen in the direction of the longitudinal axis 18 of the plunger 16, that is substantially equal to the width of the discharge opening. The valve plate 60 can be driven along a longitudinal axis that is substantially parallel to the longitudinal axis 18 of the plunger 16.

With the plunger 16 in its retracted position and the valve plate 60 in the open position, a portion of the food mass is allowed from the supply hopper 3 through the discharge opening 8 into the pump chamber 12 in front of the plunger head 20 of the plunger 16. Said portion of the food mass descends by its own weight through the discharge opening 8 into the pump chamber 12 in front of the plunger head 20 so that the substantially coherent structure of the food mass is preserved to a large extent. Then, said portion of the food mass that has been received in the pump chamber 12 is separated from the remainder of the food mass in the supply hopper 3 by moving the valve plate 60 along the plane of the discharge opening 8 to its closed position. As the valve plate moves to its closed position, the leading edge of the valve plate 60 cuts through the food mass. As a result, said portion of the food mass is cut off by the valve plate 60. The cut-off portion of the food mass is closed off in the pump chamber 12 when the valve plate 60 has reached its closed position. At this stage, the plunger is still held in its retracted position. Subsequently, while the valve plate 60 is kept in its closed position, the plunger 16 with the plunger head 20 is driven from its retracted position to its extended position so as to force said portion of the food mass out of the outlet opening 19 of the pump chamber 12. The food mass is transferred to a valve manifold 21 that can be constructed similar to the valve manifold shown in FIG. 2.

Figure 5:
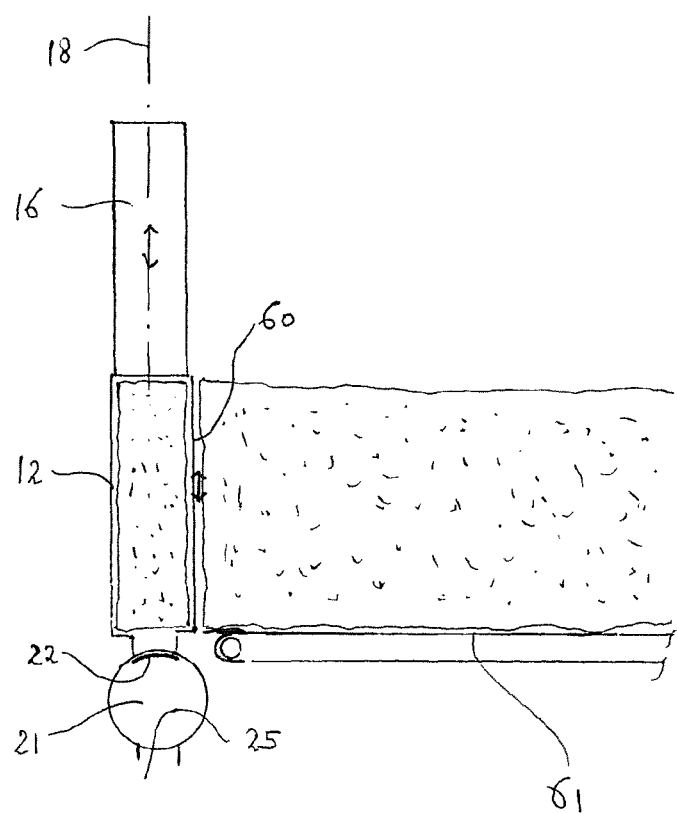
FIG. 5 diagrammatically shows a third embodiment of a system for moulding food patties according to the invention.

FIG. 5 shows a third embodiment of the system according to the invention. The same and similar components are designated with the same reference numerals. This embodiment is similar to the embodiment shown in FIG. 4. However, in this case, the food mass is supplied on a conveyor belt 61. The conveyor belt 61 is operated to supply a portion of said food mass into the pump chambers 12 that are situated adjacent to each other. Each pump chamber 16 can be closed off by a valve plate 60. The plungers 16 can be moved along a substantially vertical longitudinal axis 18 so as to displace the portion of the food mass that is isolated in the pump chamber 12 to the valve manifold 25.

The invention is not limited to the exemplary embodiments described above. It will be understood that numerous variations and modifications may be effected without departing from the scope of the invention. In addition, any feature from the description above may be combined with any of the claims, either in isolation or in any combination of features.

It is noted that the invention can also be described by the following clauses:

1. A method for moulding food patties from a food product, for example a mass of ground meat, the method comprising:
supplying food product to a supply hopper,
moving food product in the supply hopper to at least one discharge opening of the supply hopper,
discharging food product from the discharge opening of the supply hopper,
feeding food product that has been discharged from the discharge opening of the supply hopper into at least one pump chamber of a positive displacement pump system,
positively displacing food product in the pump chamber to an outlet opening of the pump chamber by the positive displacement pump system,
discharging food product from the outlet opening of the pump chamber, feeding food product that has been discharged from the outlet opening of the pump chamber into a moulding device having a plurality of mould cavities for moulding the food patties.

2. A method according to clause 1, wherein the food mass in the supply hopper is substantially not compressed in a direction transverse to the movement direction of the food mass in the supply hopper up to its discharge opening, and wherein the food mass is substantially not compressed in a direction transverse to the movement direction of the food mass when said food mass is discharged from the discharge opening of the supply hopper and fed into the pump chamber.

3. A method according to clause 2, wherein the supply hopper has a cross-sectional flow area that does not decrease from a fill opening of the supply hopper up to the discharge opening of the supply hopper.

4. A method according to clause 3, wherein the pump chamber comprises an inlet opening that is formed by the discharge opening of the supply hopper.

5. A method according to one of the preceding clauses, wherein the food product is supplied to the supply hopper from a container containing the food product, wherein the container containing the food product has been stored for at least 8 hours at a temperature below 6° C. before the food product is supplied from said container into the supply hopper.

6. A method according to one of the preceding clauses, wherein the food mass is able to move in the supply hopper to its discharge opening by means of gravity only, and wherein the food mass is able to be discharged from the discharge opening of the supply hopper and fed into the pump chamber also by means of gravity only.

7. A method according to one of the preceding clauses, wherein the food mass is not driven to the discharge opening of the supply hopper by a feed screw and is not driven from the discharge opening of the supply hopper into the pump chamber by a feed screw.

8. A method according to one of the preceding clauses, wherein the pump chamber is fed with a portion of the food mass that is cut off from the food mass in the supply hopper.

9. A method according to one of the preceding clauses, wherein the discharge opening of the supply hopper opens into a side of the pump chamber, and wherein the positive displacement pump system comprises a plunger, and a drive system that is configured to move the plunger between a retracted position, in which the plunger is clear of the discharge opening of the supply hopper, and an extended position, in which the plunger extends past the discharge opening of the supply hopper and into the pump chamber, and wherein, with the plunger in the retracted position, a portion of the food mass in the supply hopper is transferred through the discharge opening into the pump chamber in front of a plunger head of the plunger, and wherein, thereafter, said portion of the food mass is separated from the remainder of the food mass in the supply hopper and the separated portion of the food mass is closed off in the pump chamber, and wherein, when the separated portion of the food mass has been closed off in the pump chamber, the distance between the plunger head and an opposing end of the pump chamber is substantially equal to the width of the discharge opening, as seen in the direction of the longitudinal axis of the plunger, and wherein, thereafter, the plunger is driven to its extended position for impelling said portion of the food mass out of the outlet opening of the pump chamber.

10. A method according to clause 9, wherein the pump chamber has a length, as seen in the direction of the longitudinal axis of the plunger, that is greater than the width of the discharge opening, and wherein the portion of the food mass that has been transferred through the discharge opening into the pump chamber in front of the plunger head of the plunger, is separated from the remainder of the food mass in the supply hopper by advancing the plunger past the discharge opening to an intermediate position so that said portion of the food mass is pushed forward by the plunger head until said portion of the food mass is moved past the discharge opening and closed off therefrom in the pump chamber, and wherein, thereafter, the plunger is advanced further to its extended position for impelling said portion of the food mass out of the outlet opening of the pump chamber.

11. A method according to one of the preceding clauses, wherein the positive displacement pump comprises a valve plate that can be driven between an open position, in which the valve plate is clear of the discharge opening of the supply hopper, and a closed position, in which the valve plate closes the discharge opening of the supply hopper, and wherein, with the valve plate in the open position, a portion of the food mass in the supply hopper is transferred through the discharge opening into the pump chamber in front of the plunger head of the plunger, and wherein, thereafter, the portion of the food mass that has been transferred through the discharge opening into the pump chamber in front of the plunger head of the plunger, is separated from the remainder of the food mass in the supply hopper by moving the valve plate along the discharge opening to its closed position so that said portion of the food mass is cut off by the valve plate, and wherein, with the valve plate in its closed position, the cut-off portion of the food mass is closed off in the pump chamber, and wherein, thereafter, the plunger is advanced further to its extended position for impelling said portion of the food mass out of the outlet opening of the pump chamber.

12. A method according to one of the preceding clauses, wherein the positive displacement pump system is configured to substantially maintain the structural characteristics of at least a portion of the food mass when said food mass is positively displaced in the pump chamber to its outlet opening.

13. A method according to one of the preceding clauses, wherein the food mass in the pump chamber is substantially not compressed in a direction transverse to the movement direction of the food mass in the pump chamber up to its outlet opening, and wherein the food mass is substantially not compressed in a direction transverse to the movement direction of the food mass when said food mass is discharged from the outlet opening of the pump chamber.

14. A method according to one of the preceding clauses, wherein the supply hopper comprises:
  a main hopper zone that receives the food mass that is supplied to the supply hopper,
  a dividing member, preferably a knife edge, that is arranged inside the supply hopper at a downstream end of the main hopper zone, wherein the dividing member divides the food mass into two streams of food mass,
  two feed channels, each feed channel extending from the dividing member, wherein each feed channel transports one of said streams of food mass, and also
  two discharge openings, each discharge opening extending at a downstream end of one of the feed channels, wherein each discharge opening discharges one of said streams of food mass or a portion thereof, and wherein the positive displacement pump system comprises:
   two pump chambers, each pump chamber being in communication with one of the discharge openings, and each pump chamber having an outlet opening,
   a valve manifold that is connected to the outlet openings of the pump chambers, and
   wherein the valve manifold comprises an outlet passageway that is connected to the moulding device, and wherein the food mass or a portion thereof of said streams are fed into the pump chambers in alternation so that at least one pump chamber always contains food mass under pressure so as to supply a substantially continuous flow of food mass from the pump chambers via the valve manifold to the moulding device.

15. A method according to clause 14, wherein the total cross-section flow area of the feed channels together is substantially equal to the cross-sectional flow area of the main hopper zone, and wherein the cross-sectional flow area of each discharge opening is substantially equal to the cross-sectional flow area of the associated feed channel.

16. A method according to clause 14 or 15, wherein the pump chambers are situated on either side of the valve manifold.

17. A method according to clause 16, wherein the positive displacement pump system comprises one plunger for each pump chamber, wherein each plunger can be moved between a retracted position, in which said plunger is clear of the discharge opening of one of the feed channels, and an extended position, in which said plunger extends past the discharge opening of said one of the feed channels and into the associated pump chamber, and wherein the longitudinal axes of the plungers of the pump chambers are situated substantially in the same vertical plane.

18. A method according to one of the clauses 14-17, wherein the valve manifold comprises a valve member that can be operated alternately between a first position, in which the valve member closes the outlet opening of a first pump chamber and allows food mass to be transferred from the outlet opening of the other second pump chamber to the outlet passageway that is connected to the moulding device, and a second position, in which the valve member closes the outlet opening of said other second pump chamber and allows food mass to be transferred from the outlet opening of said first pump chamber to the outlet passageway that is connected to the moulding device.

19. A method according to clause 18, wherein the valve member is configured to cut through the food mass in the valve manifold when the valve member is operated between the first and second position.

20. A method according to one of the preceding clauses, wherein the food product that is supplied to the supply hopper comprises ground meat or minced meat, for example comprising ground or minced beef and/or ground or minced porc.

21. A method according to one of the preceding clauses, wherein the moulding device comprises a moulding drum which is rotatable about a rotation axis, and wherein the moulding drum has a substantially cylindrical moulding surface in which the plurality of mould cavities for moulding the food patties are arranged.

22. A method according to clause 21, wherein the food product that has been discharged from the outlet opening of the pump chamber is fed to a dispensing mouth that adjoins the moulding surface of the moulding drum, and wherein the dispensing mouth is surrounded by an abutment plate that sealingly abuts the moulding surface of the moulding drum during rotation of the moulding drum about the rotation axis.

23. A method according to one of the preceding clauses, wherein the moulding device comprises a mould plate having the plurality of mould cavities, and wherein the mould plate is cyclically moved by a mould plate drive between a fill position, in which mould cavities are in communication with the outlet opening of the pump chamber so as to mould food patties in said mould cavities, and a discharge position, in which the food patties moulded in said mould cavities can be knocked-out of said mould cavities.

24. A method according to one of the preceding clauses, wherein the supply hopper and the positive displacement pump system are situated above the moulding device so that the food product that has been discharged from the outlet opening of the pump chamber is fed downward into the moulding device.

25. A method according to clause 24, wherein the supply hopper and the positive displacement pump system are fixed in a frame, and wherein the moulding device can be displaced with respect to the frame between an upper position, in which the moulding device is connected to the positive displacement pump system, and a lower position, in which the moulding device is at a distance below the positive displacement pump system.

26. A system for moulding food patties from a food product, for example a mass of ground meat, the system comprising:
   a supply hopper for receiving a food product, the supply hopper comprising at least one discharge opening and being configured to allow food product in the supply hopper to move to the discharge opening,
   a positive displacement pump system comprising at least one pump chamber, the pump chamber being connected to the discharge opening of the supply hopper for feeding food product that is discharged from the discharge opening of the supply hopper into said pump chamber, the positive displacement pump system being configured to positively displace food product in the pump chamber to an outlet opening of the pump chamber and to discharge food product from said outlet opening,
   a moulding device having a plurality of mould cavities for moulding the food patties, the moulding device being connected to the outlet opening of the pump chamber for feeding food product that has been discharged from the outlet opening of the pump chamber into said moulding device.

27. A system according to clause 26, wherein the system is configured to carry out the method according to one of the clauses 1-25.

The invention claimed is:
1. A method for moulding food patties from a food mass, wherein use is made of a system comprising:
   a hopper having a lower end;
   a dividing member arranged in said hopper;
   a first feed channel and a second feed channel, each of said first and second feed channels connecting to said lower end of said hopper and extending downwards from said hopper to a discharge end of said feed channel;
   a first pump and a second pump, each of said first and second pumps comprising a pump chamber, a pump inlet opening, a plunger, a drive system adapted to move the plunger in said pump chamber along a longitudinal axis of the plunger between a retracted position and an extended position, and a pump outlet opening, wherein the discharge end of the first feed channel is in communication with the pump inlet opening of the first pump, and wherein the discharge end of the second feed channel is in communication with the pump inlet opening of the second pump;

a first valve plate arranged proximate the pump inlet opening of the first pump, and a second valve plate arranged proximate the pump inlet opening of the second pump;

a valve manifold having a movable valve member, wherein the pump chamber of the first pump is connected to the valve manifold at a first location on the valve manifold and wherein the pump chamber of the second pump is connected to the valve manifold at a second location on the valve manifold such that said longitudinal axes of said plungers of said first and second pumps are arranged in a V-pattern or in a common horizontal plane, wherein said valve manifold is operable to open and close the pump outlet openings of the first and second pumps, and wherein the valve manifold comprises an outlet passageway; and a moulding device having a plurality of mould cavities for moulding food patties, said moulding device being arranged below the valve manifold and in communication with the outlet passageway of the valve manifold, wherein the method comprises:

filling the food mass into the hopper, said food mass being divided into first and second streams by the dividing member arranged in said hopper as the food mass descends in said hopper, said first stream entering the first feed channel and the second stream entering the second feed channel under a weight of the food mass;

moving the plunger of the first pump to the retracted position and moving the first valve plate into an open position so that a portion of food mass of the first stream is introduced into the pump chamber of the first pump under the weight of the food mass present in the hopper and in the first feed channel;

followed by moving the first valve plate into a closed position so that said portion of food mass that has been introduced into the pump chamber of the first pump is cut from the first stream of food mass in the first feed channel;

operating the valve manifold such that the pump outlet opening of the first pump is open and connected to the outlet passageway of the valve manifold and via said outlet passageway to the moulding device and such that the pump outlet opening of the second pump is closed;

moving the plunger of the first pump to the extended position to transfer said portion of food mass from the pump chamber of the first pump to the moulding device via the valve manifold, said moulding device being operated to fill the mould cavities with said food mass from the first pump to mould the food patties therein;

and wherein the method further comprises, whilst the plunger of the first pump is being moved to the extended position:

moving the plunger of the second pump to the retracted position and moving the second valve plate into an open position so that a portion of food mass from the second stream is introduced into the pump chamber of the second pump under the weight of the food mass present in the hopper and in the second feed channel; and followed by moving the second valve plate into a closed position so that said portion of food mass that has been introduced into the pump chamber of the second pump is cut from the second stream of food mass in the second feed channel;

and wherein the method further comprises, as the plunger of the first pump has reached the extended position:

operating the valve manifold such that the pump outlet opening of the first pump is closed and such that the pump outlet opening of the second pump is open and connected to the outlet passageway of the valve manifold and via said outlet passageway to the moulding device; and moving the plunger of the second pump to the extended position to transfer said portion of food mass from the pump chamber of the second pump to the moulding device via the valve manifold, said moulding device being operated to fill the mould cavities with said food mass of the second pump to mould the food patties therein.

2. A method as claimed in claim 1, wherein the food mass is supplied to the hopper from a container in which the food mass has been stored for at least 8 hours at a temperature below 6° C.

3. A method as claimed in claim 1, wherein the food mass moves in the hopper and in the first and second feed channels by means of gravity only, and wherein the food mass is fed into the pump chambers of the first and second pumps also by means of gravity only upon opening of the first and second valve plates.

4. A method as claimed in claim 1, wherein each of the hopper, the first feed channel, the second feed channel, the pump inlet opening of the first pump, and the pump inlet opening of the second pump comprises a cross-sectional flow area, wherein the cross-sectional flow area of the first and second feed channels combined is equal to the cross-sectional flow area of the hopper, wherein the cross-sectional flow area of the pump inlet opening of the first pump is equal to the cross-sectional flow area of the first feed channel, and wherein the cross-sectional flow area of the pump inlet opening of the second pump is equal to the cross-sectional flow area of the second feed channel.

5. A method as claimed in claim 1, wherein the moulding device comprises a moulding drum which is rotatable about a rotation axis, and wherein the moulding drum has a substantially cylindrical moulding surface in which the plurality of mould cavities for moulding the food patties are arranged.

6. A method as claimed in claim 5, wherein the portion of food mass that has been transferred from the pump outlet opening of one of the first or second pumps is fed via the valve manifold to a dispensing mouth that adjoins the moulding surface of the moulding drum, and wherein the dispensing mouth is surrounded by an abutment plate that sealingly abuts the moulding surface of the moulding drum during rotation of the moulding drum about the rotation axis.

7. A method as claimed in claim 1, wherein the moulding device comprises a mould plate having the plurality of mould cavities, and wherein the mould plate is cyclically moved by a mould plate drive between a fill position, in which at least some of the plurality of mould cavities are in communication with the outlet passageway of the valve manifold so as to mould food patties in said mould cavities, and a discharge position, in which the food patties moulded in said mould cavities are discharged from said mould cavities.

8. The method as claimed in claim 1, further comprising:
storing a container containing the food mass for at least 8 hours at a temperature below 6 degrees Celsius; and supplying the food mass to the hopper from the container, wherein the container comprises a substantially rectangular or square base and a peripheral wall that extends from the base to an upper end and wherein the upper end of the peripheral wall defines a container opening of the container.

9. A method as claimed in claim 1, wherein the food mass comprises ground meat.

10. A method as claimed in claim 1, wherein the food mass in the hopper is not compressed in a direction transverse to a first descending movement direction of the food mass in the hopper, and wherein the food mass is not compressed in a direction transverse to a second descending movement direction of the food mass when said food mass is discharged from the one of the first or second feed channels and fed into the pump chamber of one of the first or second pumps.

11. A method as claimed in claim 10, wherein the first descending movement direction and the second descending movement direction are oriented at an angle relative to each other.

* * * * *